(12) United States Patent
Kim et al.

(10) Patent No.: US 12,484,414 B2
(45) Date of Patent: Nov. 25, 2025

(54) DISPLAY DEVICE

(71) Applicant: LG Display Co., Ltd., Seoul (KR)

(72) Inventors: Juhong Kim, Goyang-si (KR); Hwideuk Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 610 days.

(21) Appl. No.: 17/980,430

(22) Filed: Nov. 3, 2022

(65) Prior Publication Data

US 2023/0217777 A1    Jul. 6, 2023

(30) Foreign Application Priority Data

Dec. 31, 2021   (KR) .......................... 10-2021-0193996

(51) Int. Cl.
*H10K 59/40*    (2023.01)
*G06F 3/041*    (2006.01)
*H10K 59/126*   (2023.01)
*H10K 59/131*   (2023.01)

(52) U.S. Cl.
CPC ........... *H10K 59/40* (2023.02); *G06F 3/0412* (2013.01); *H10K 59/126* (2023.02); *H10K 59/131* (2023.02)

(58) Field of Classification Search
CPC .. G06F 2203/04111; G06F 2203/04112; G06F 3/0412; G06F 3/04164; G06F 3/0443; G06F 3/0446; H10K 59/126; H10K 59/131; H10K 59/40
See application file for complete search history.

(56) References Cited

U.S. PATENT DOCUMENTS

2017/0213873 A1*   7/2017   Bok ..................... H10K 59/131
2022/0206610 A1*   6/2022   Kim ...................... G06F 3/0446

FOREIGN PATENT DOCUMENTS

KR        20180131802 A     12/2018
KR        20210021793 A     3/2021

* cited by examiner

*Primary Examiner* — Robin J Mishler
(74) *Attorney, Agent, or Firm* — Seed Intellectual Property Law Group LLP (57) ABSTRACT

The display device includes a substrate in which a plurality of pixels each including an emissive area and a transmissive area is disposed. The device includes a plurality of touch lines and a plurality of data lines in the emissive area. The device includes a compensation electrode coupled to at least one of the plurality of touch lines. The device includes a planarization layer on the plurality of touch lines and the plurality of data lines and including an opening corresponding to the transmissive area. The device includes a light emitting diode on the planarization layer in the emissive area and a touch electrode disposed within the opening in the transmissive area. The plurality of touch lines includes a first touch line and a second touch line closer to the plurality of data lines than the first touch line. The compensation electrode is coupled to the first touch line.

16 Claims, 6 Drawing Sheets

DISPLAY DEVICE

CROSS-REFERENCE TO RELATED APPLICATION

This application claims the priority of Korean Patent Application No. 10-2021-0193996 filed on Dec. 31, 2021, in the Korean Intellectual Property Office, the disclosure of which is incorporated herein by reference.

BACKGROUND

Technical Field

The present disclosure relates to a display device, and more particularly, to a display device which can have an improved accuracy in touch sensing.

Description of the Related Art

With the advent of the information age, display device fields for visually displaying electrical information signals are under rapid development. Accordingly, efforts to decrease the volume, weight, and power consumption of various display devices have been made.

Some of these display devices provide a touch-based input type that enables a user to easily input information or commands intuitively and conveniently, apart from a conventional input type using buttons, a keyboard, a mouse, or the like. The touch-based display device can be roughly classified into a self-capacitance type and a mutual-capacitance type. A self-capacitance type display device in which a capacitance is formed between a plurality of touch electrodes and a user's input may recognize a touch based on a change in capacitance generated at the time of a touch by the user. A mutual-capacitance type display device in which touch electrodes are divided into a driving electrode and a sensing electrode and a mutual capacitance is formed between them may recognize a touch based on a change in a mutual capacitance generated at the time of a touch by the user.

BRIEF SUMMARY

One or more embodiments the present disclosure provide a display device having an in-cell touch structure.

One or more embodiments the present disclosure provide a display device which can have an improved accuracy in touch sensing.

Technical benefits of the present disclosure are not limited to the above-mentioned benefits, and other benefits, which are not mentioned above, can be clearly understood by those skilled in the art from the following descriptions.

According to an aspect of the present disclosure, the display device includes: a substrate in which a plurality of pixels each including an emissive area and a transmissive area is disposed. Also, the display device includes a plurality of touch lines in the emissive area and a plurality of data lines in the emissive area. Further, the display device includes a compensation electrode electrically connected to at least one of the plurality of touch lines. Furthermore, the display device includes a planarization layer on the plurality of touch lines and the plurality of data lines and including an opening corresponding to the transmissive area. Moreover, the display device includes a light emitting diode on the planarization layer in the emissive area and a touch electrode disposed within the opening in the transmissive area. The plurality of touch lines includes a first touch line and a second touch line closer to the plurality of data lines than the first touch line. The compensation electrode is electrically connected to the first touch line.

Other detailed matters of the example embodiments are included in the detailed description and the drawings.

According to the present disclosure, it is possible to implement a transparent display device having an in-cell structure.

According to the present disclosure, it is possible to reduce or minimize a difference in capacitance between touch lines by using a compensation electrode within a pixel.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features, and other advantages of the present disclosure will be more clearly understood from the following detailed description taken in conjunction with the accompanying drawings, in which.

DETAILED DESCRIPTION

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next,"

one or more parts may be positioned between the two parts unless the terms are used with the term "immediately" or "directly".

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, the present disclosure will be described in detail with reference to accompanying drawings.

Figure 1:
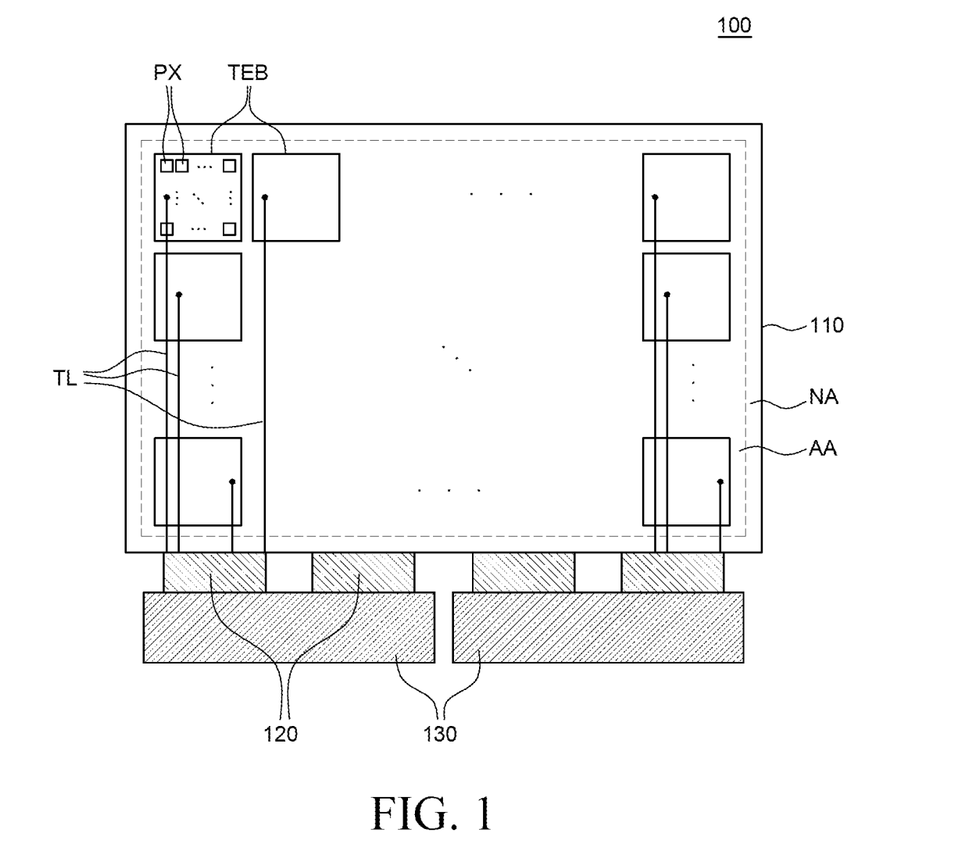
FIG. 1 is a plan view illustrating a display device according to an example embodiment of the present disclosure.
Figure 2:
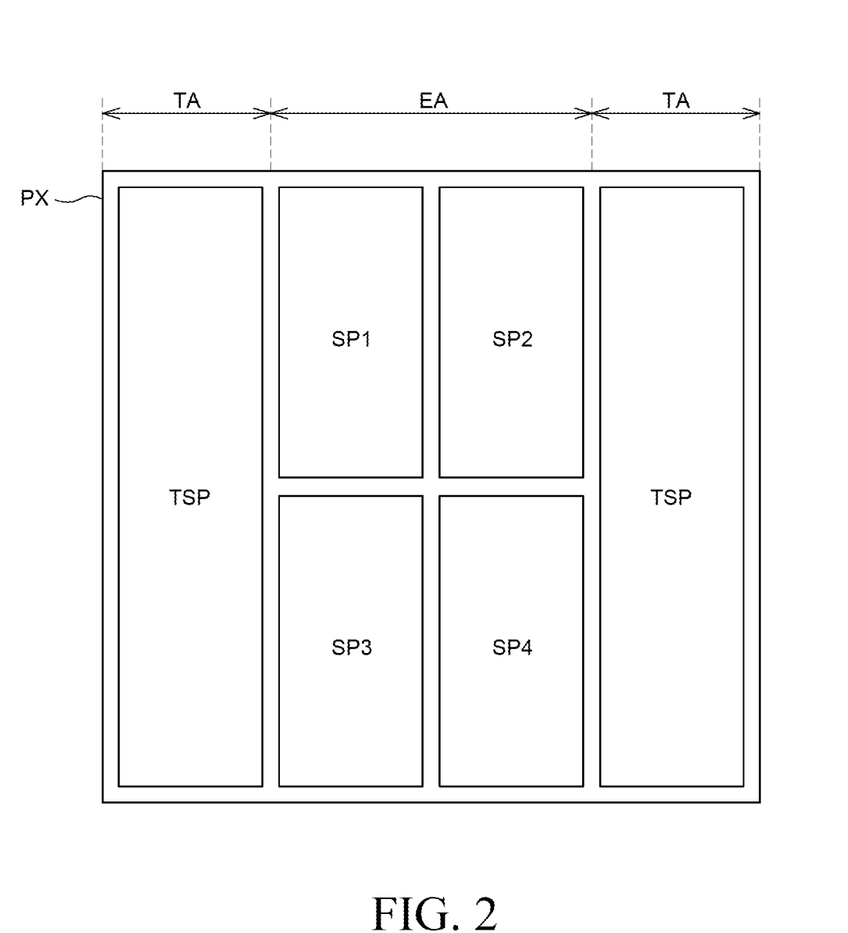
FIG. 2 is a configuration diagram of a pixel shown in FIG. 1.

FIG. 1 is a plan view illustrating a display device according to an example embodiment of the present disclosure. FIG. 2 is a configuration diagram of a pixel shown in FIG. 1. In FIG. 1, for the convenience of description, only a substrate 110, a plurality of flexible films 120, and a plurality of printed circuit boards 130 among various components of a display device 100 are illustrated.

Referring to FIG. 1, the display device 100 according to an example embodiment of the present disclosure includes the substrate 110, the plurality of flexible films 120, and the plurality of printed circuit boards 130. The display device 100 may be a transparent display device having an in-cell touch structure.

The substrate 110 includes a display area AA and a non-display area NA.

The display area AA is disposed at a central portion of the substrate 110, and may be an area where an image is displayed in the display device 100. In the display area AA, a display element and various driving elements for driving the display element may be disposed. For example, the display element may be configured by a light emitting diode OLED including an anode AN, an emission layer EL, and a cathode CT which will be described later. Further, various driving elements, such as transistors TR, capacitors, and lines, for driving the display element may be disposed in the display area AA.

In the display area AA, a plurality of touch electrode blocks TEB is disposed. The plurality of touch electrode blocks TEB may include a plurality of touch electrodes TE which will be described later with reference to FIG. 3 and FIG. 4. That is, the plurality of touch electrodes TE disposed in the display area AA may be divided into a plurality of blocks according to an area and may form the plurality of touch electrode blocks TEB. Herein, the plurality of touch electrodes TE disposed in a single touch electrode block TEB may be electrically connected to each other. Further, the plurality of touch electrode blocks TEB may be electrically connected to a plurality of touch lines TL, respectively. Accordingly, the plurality of touch electrode blocks TEB may recognize a touch by receiving a touch driving signal through the plurality of touch lines TL. Also, the plurality of touch electrode blocks TEB may transmit a touch sensing signal to the plurality of touch lines TL. The plurality of touch electrode blocks TEB may recognize a touch by a self-capacitance type method.

In each of the plurality of touch electrode blocks TEB, a plurality of pixels PX is disposed. Each of the plurality of pixels PX includes an emissive area EA and a transmissive area TA.

Specifically, referring to FIG. 2, each pixel PX includes the emissive area EA and the transmissive area TA. In the emissive area EA, a plurality of sub-pixels SP may be disposed. In the transmissive area TA, a touch sensor part TSP may be disposed.

The emissive area EA may be an area where an image is actually implemented as light is emitted. The emissive area EA may be defined as an area where a plurality of transmissive areas TA is not disposed within a pixel PX. In the emissive area EA, the plurality of sub-pixels SP may be disposed. That is, the emissive area EA may emit light through a light emitting diode OLED disposed in each of the plurality of sub-pixels SP. The plurality of sub-pixels SP may emit light of different wavelengths, respectively. For example, the plurality of sub-pixels SP may include a first sub-pixel SP1, a second sub-pixel SP2, a third sub-pixel SP3, and a fourth sub-pixel SP4. Herein, the first sub-pixel SP1 may be a red sub-pixel, the second sub-pixel SP2 may be a green sub-pixel, the third sub-pixel SP3 may be a blue sub-pixel, and the fourth sub-pixel SP4 may be a white sub-pixel. That is, a single pixel PX may include four sub-pixels SP1, SP2, SP3, and SP4 emitting light of different colors. However, the present disclosure is not limited thereto.

Each sub-pixel SP is a minimum unit for forming an image, and each of the plurality of sub-pixels SP may include a light emitting diode OLED and a driver circuit. The plurality of sub-pixels SP may be electrically connected to a plurality of gate lines GL disposed in a first direction and a plurality of data lines DL disposed in a second direction different from the first direction. Herein, the first direction may be a horizontal direction shown in FIG. 1 and FIG. 2, and the second direction may be a vertical direction shown in FIG. 1 and FIG. 2, but may not be limited thereto.

The driver circuit of the sub-pixel SP is a circuit for controlling driving of the light emitting diode OLED. For example, the driver circuit may include a switching transistor, a driving transistor, a capacitor, and the like. The driver circuit may be electrically connected to signal lines such as gate lines GL and data lines DL connected to a gate driver IC, a data driver IC, and the like disposed in the non-display area NA.

The transmissive area TA may be an area through which at least a part of light incident from the outside is transmitted. In the transmissive area TA, the plurality of sub-pixels SP is not disposed. In the transmissive area TA, the touch sensor part TSP may be disposed. The transmissive area TA may be made of a transparent material. Accordingly, the display device 100 may have transparency due to the transmissive area TA. A plurality of transmissive areas TA may be disposed within a single pixel PX. For example, transmissive areas TA may be respectively disposed on both side portions of the pixel PX, but is not limited thereto.

In the touch sensor part TSP, a touch electrode TE for sensing a touch is disposed. The touch electrode TE may be electrically connected to a touch line TL and may receive a touch driving signal from a touch driver IC or transmit a touch sensing signal to the touch driver IC. The touch electrode TE may be made of a transparent conductive material. Also, a dummy organic layer DM and a plurality of insulating layers, which will be described later, may be disposed in the touch sensor part TSP. Herein, the dummy organic layer DM and the plurality of insulating layers may be made of a transparent material.

The non-display area NA is disposed in a circumferential area of the substrate 110 and may be an area where an image is not displayed. The non-display area NA may be disposed to surround the display area AA, but is not limited thereto. In the non-display area NA, various components for driving the plurality of sub-pixels SP and the plurality of touch sensor parts TSP disposed in the display area AA may be disposed. For example, a driver IC that supplies a signal for driving the plurality of sub-pixels SP and the plurality of touch sensor parts TSP, a driver circuit, a signal line, a flexible film 120, and the like may be disposed in the non-display area NA.

The plurality of flexible films 120 is disposed at one end of the substrate 110. The plurality of flexible films 120 is electrically connected to one end of the substrate 110. Each of the plurality of flexible films 120 is a film in which various components are disposed on a base film having a malleability to supply a signal to the plurality of sub-pixels SP in the display area AA. One ends of the plurality of flexible films 120 may be disposed in the non-display area NA of the substrate 110 to supply a data voltage or the like to the plurality of sub-pixels SP in the display area AA. Meanwhile, although four flexible films 120 are illustrated in FIG. 1, the number of flexible films 120 may vary depending on the design and is not limited thereto.

A driver IC, such as a gate driver IC, a data driver IC or a touch driver IC, may be disposed on each of the plurality of flexible films 120. The driver IC may be a component to process data for displaying images and a driving signal for processing the data. The driver IC may process a touch driving signal and a touch sensing signal for sensing a touch. The driver IC may be disposed by a chip on glass (COG), chip on film (COF), or tape carrier package (TCP) technique depending on a mounting method. However, in this present specification, for the convenience of description, the driver IC is described as being mounted on the plurality of flexible films 120 by the COF technique, but is not limited thereto.

The printed circuit board 130 is connected to the plurality of flexible films 120. The printed circuit board 130 may be a component to supply signals to the driver IC. In the printed circuit board 130, various components to supply various driving signals, such as a driving signal or a data voltage, to the driver IC may be disposed. Meanwhile, although two printed circuit boards 130 are illustrated in FIG. 1, the number of printed circuit boards 130 may vary depending on the design and is not limited thereto.

The display device 100 is a transparent display device. The display device 100 may have transparency due to the plurality of transmissive areas TA and may also display an image through the emissive area EA. That is, the display device 100 may display an image, such as a video, a static image, a still cut, or the like, as light is emitted through the emissive area EA. Also, the display device 100 may have transparency by transmitting light incident from the outside through the plurality of transmissive areas TA.

The display device 100 may be a top emission type display device. For the top emission type, light emitted from the light emitting diode OLED is emitted toward an upper portion of the substrate 110 on which the light emitting diode OLED is disposed. In the case of the top emission type, a reflective layer may be formed below the anode to allow the light emitted from the light emitting diode to travel to the upper portion of the substrate, e.g., toward the cathode.

Figure 3:
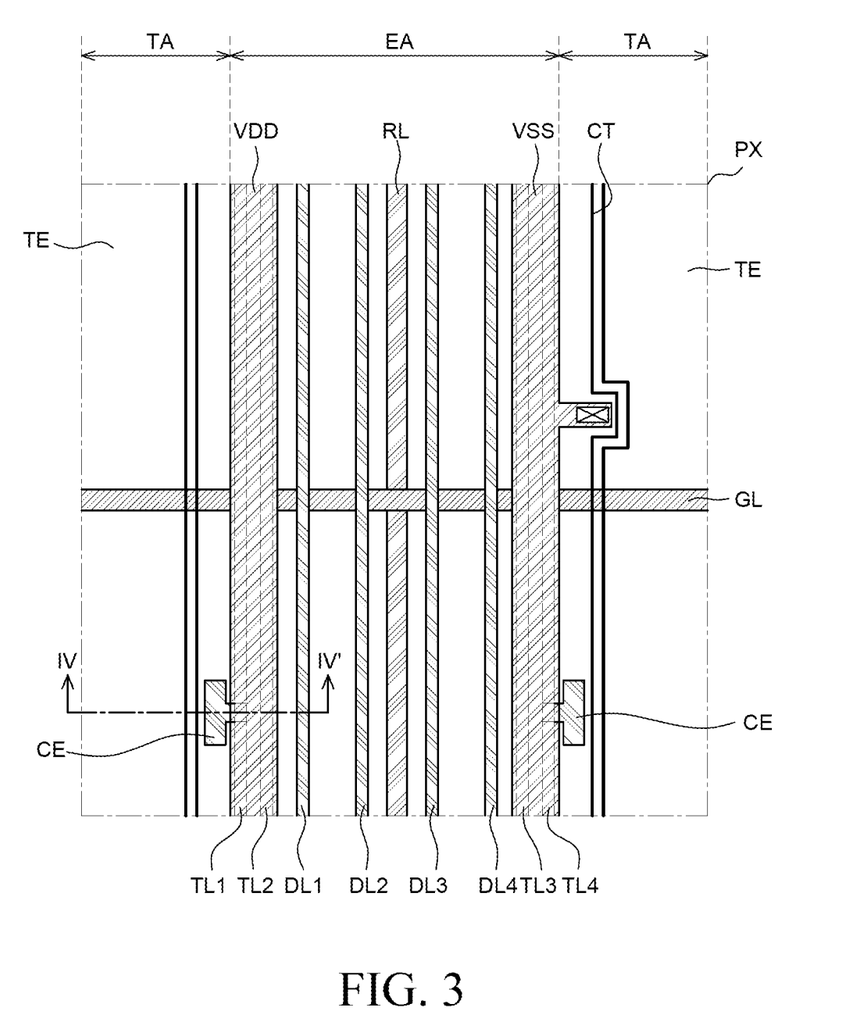
FIG. 3 is an enlarged view of the pixel shown in FIG. 2.
Figure 4:
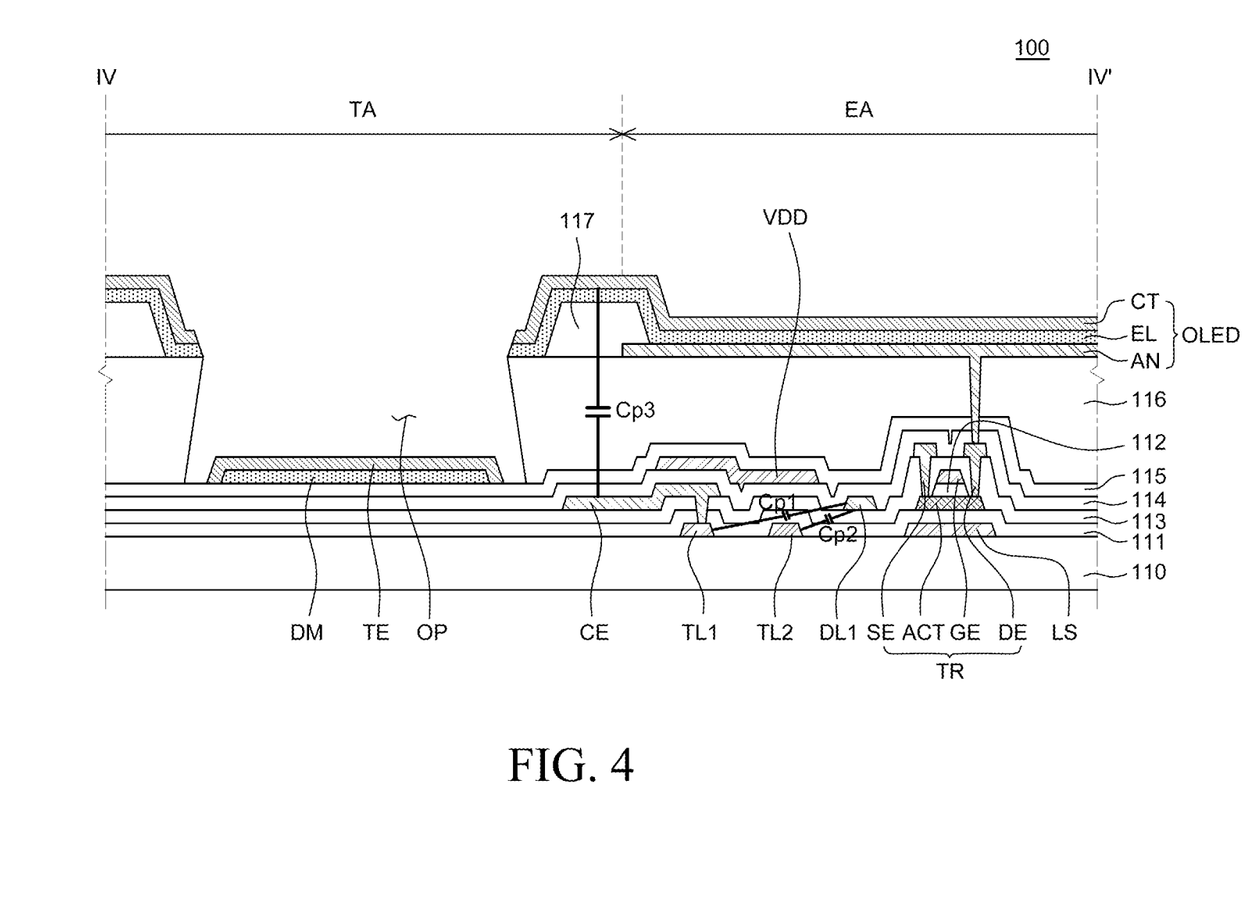
FIG. 4 is a cross-sectional view as taken along a line IV-IV' of FIG. 3.

FIG. 3 is an enlarged view of the pixel shown in FIG. 2. FIG. 4 is a cross-sectional view as taken along a line IV-IV' of FIG. 3. In FIG. 3, for the convenience of description, only a gate line GL, data lines DL, a reference line RL, a high-potential power line VDD, a low-potential power line VSS, touch lines TL, a cathode CT, touch electrodes TE, and compensation electrodes CE among various components of the display device 100 are illustrated. Also, the edges of the cathode CT and the touch electrodes TE are indicated by thick solid lines.

Referring to FIG. 3 and FIG. 4, the display device 100 includes the substrate 110, a light shielding layer LS, a reference line RL, touch lines TL, a gate line GL, a data line DL, a compensation electrode CE, a high-potential power line VDD, a low-potential power line VSS, a transistor TR, the light emitting diode OLED, and a touch electrode TE.

Meanwhile, referring to FIG. 2, the emissive area EA includes the plurality of sub-pixels SP, and the transmissive area TA includes the touch sensor part TSP. That is, although not shown in FIG. 3, the emissive area EA includes the first sub-pixel SP1, the second sub-pixel SP2, the third sub-pixel SP3, and the fourth sub-pixel SP4. Specifically, the left and right sides of the reference line RL on the gate line GL may correspond to the first sub-pixel SP1 and the second sub-pixel SP2, respectively. Also, the left and right sides of the reference line RL under the gate line GL may correspond to the third sub-pixel SP3 and the fourth sub-pixel SP4, respectively. Further, in the transmissive area TA, an area where the touch electrode TE is disposed may correspond to the touch sensor part TSP.

In the emissive area EA, a plurality of touch lines TL, a plurality of data lines DL, the high-potential power line VDD, the low-potential power line VSS, the transistor TR, and the light emitting diode OLED are disposed. That is, the emissive area EA includes the plurality of sub-pixels SP where light is actually emitted, and may be defined as an area where the driver circuit is disposed.

In the transmissive area TA, the plurality of touch lines TL, the plurality of data lines DL, the high-potential power line VDD, the low-potential power line VSS, the transistor TR, and the light emitting diode OLED are not disposed. That is, it is beneficial to configure the transmissive area TA to allow objects behind the display device 100 to be seen through the transmissive area TA. Therefore, the transmissive area TA is configured to transmit light. Accordingly, the plurality of touch lines TL, the plurality of data lines DL, the high-potential power line VDD, the low-potential power line VSS, the transistor TR, and the light emitting diode OLED containing an opaque material are not disposed in the transmissive area TA. Thus, transparency or translucency of the transmissive area TA can be implemented.

Meanwhile, since the gate line GL is disposed in the first direction crossing the pixel PX, a part of the gate line GL may be disposed to pass through the transmissive area TA. However, an area overlapping with the gate line GL is just a part of the transmissive area TA. Therefore, the transmissive area TA can maintain transparency.

The substrate 110 is a substrate for supporting and protecting various components of the display device 100. The substrate 110 may be made of glass or a plastic material having flexibility. When the substrate 110 is made of a plastic material, the substrate 110 may be made of, for example, polyimide (PI), but is not limited thereto.

The reference line RL, the plurality of touch lines TL, and the light shielding layer LS are disposed on the substrate 110. The reference line RL, the plurality of touch lines TL, and the light shielding layer LS may be disposed in the emissive area EA. The reference line RL, the plurality of touch lines TL, and the light shielding layer LS may be made of the same material by the same process on the substrate 110. For example, the reference line RL, the plurality of touch lines TL, and the light shielding layer LS may be made of a conductive material such as copper (Cu), aluminum (Al), molybdenum (Mo), nickel (Ni), titanium (Ti), chromium (Cr), or an alloy thereof, but are not limited thereto.

The reference line RL is a line extended from a central portion of the pixel PX in the second direction and configured to transfer a reference voltage to each of the plurality of sub-pixels SP. For example, the reference line RL may be disposed between the first sub-pixel SP1 and the second sub-pixel SP2 and between the third sub-pixel SP3 and the fourth sub-pixel SP4. A plurality of sub-pixels SP forming a single pixel PX may share a single reference line RL. For example, a single reference line RL may transfer a reference voltage to each of the first sub-pixel SP1, the second sub-pixel SP2, the third sub-pixel SP3, and the fourth sub-pixel SP4.

The plurality of touch lines TL applies a touch driving signal to the plurality of touch electrodes TE and receives a touch sensing signal from the plurality of touch electrodes TE. The plurality of touch lines TL may be extended in the second direction of the substrate 110. A part of the plurality of touch lines TL may be extended to the transmissive area TA so as to be in contact with the touch electrode TE.

Four touch lines TL may be disposed in a single pixel PX. That is, the touch lines TL may include a first touch line TL1, a second touch line TL2, a third touch line TL3, and a fourth touch line TL4. Herein, the first touch line TL1 and the second touch line TL2 may be disposed adjacent to the transmissive area TA disposed on one side of the emissive area EA. The third touch line TL3 and the fourth touch line TL4 may be disposed adjacent to the transmissive area TA disposed on the other side of the emissive area EA. The plurality of touch lines TL1, TL2, TL3, and TL4 may be electrically connected to different touch electrode blocks TEB, respectively. For example, the first touch line TL1 may be electrically connected to all the touch electrodes TE within the plurality of pixels PX disposed in one of the plurality of touch electrode blocks TEB.

Meanwhile, FIG. 3 illustrates that four touch lines TL are disposed in a single pixel PX, but the present disclosure is not limited thereto. That is, the number of touch lines TL overlapping with a single pixel PX may vary depending on the design of the display device 100.

The light shielding layer LS may be disposed to overlap with an active layer ACT of the transistor TR. The light shielding layer LS may block light incident to the active layer ACT. When light is irradiated to the active layer ACT, a leakage current occurs. Therefore, the reliability of the transistor TR, which is a driving transistor, may decrease. Accordingly, if the light shielding layer LS made of an opaque conductive material is disposed to overlap with the active layer ACT, it is possible to block light incident to the active layer ACT from below the substrate 110. Therefore, the reliability of the transistor TR can be improved by the light shielding layer LS.

Meanwhile, although not shown in the drawings, the light shielding layer LS may be electrically connected to a source electrode SE or a drain electrode DE of the transistor TR. If the light shielding layer LS electrically floats, a parasitic capacitance between the light shielding layer LS and the active layer ACT is changed. Also, a shift amount of a threshold voltage of the transistor TR may vary. This may cause a visual defect such as a change in brightness. Accordingly, the light shielding layer LS is electrically connected to the source electrode SE or the drain electrode DE, and, thus, a constant parasitic capacitance can be maintained.

A buffer layer 111 is disposed on the reference line RL, the plurality of touch lines TL, and the light shielding layer LS. The buffer layer 111 is configured to insulate components on and under the buffer layer 111 and may be made of an insulating material. For example, the buffer layer 111 may be formed as a single layer of silicon oxide (SiOx) or silicon nitride (SiNx) or a multilayer thereof, but is not limited thereto.

The transistor TR is disposed on the buffer layer 111. The transistor TR may be disposed in the emissive area EA. The transistor TR may be used as a driving element for driving the light emitting diode OLED. The transistor TR includes the active layer ACT, a gate electrode GE, the source electrode SE, and the drain electrode DE. The transistor TR shown in FIG. 4 is a driving transistor and is a thin film transistor having a top gate structure where the gate electrode GE is disposed on the active layer ACT, but is not limited thereto. The transistor TR may also be implemented as a transistor having a bottom gate structure.

FIG. 4 illustrates only the driving transistor TR among various transistors included in the display device 100, but another transistor such as a switching transistor may also be disposed on the buffer layer 111.

The active layer ACT is disposed on the buffer layer 111. The active layer ACT is an area where a channel is formed when the transistor TR is driven. The active layer ACT may be made of a semiconductor material such as an oxide semiconductor, amorphous silicon, or polysilicon, but is not limited thereto. For example, when the active layer ACT is made of an oxide semiconductor, the active layer ACT is made up of a channel region, a source region, and a drain region. Here, the source region and the drain region may be conductive regions, but are not limited thereto.

A gate insulating layer 112 is disposed on the active layer ACT. The gate insulating layer 112 is configured to electrically insulate the active layer ACT from the gate electrode GE and may be made of an insulating material. As shown in FIG. 4, the gate insulating layer 112 may be patterned on the active layer ACT so as to have the same width as the gate electrode GE, but is not limited thereto. That is, the gate insulating layer 112 may be formed throughout the entire surface of the substrate 110. The gate insulating layer 112 may be formed as a single layer of silicon nitride (SiNx) or silicon oxide (SiOx) which is an inorganic material or a multilayer thereof, but is not limited thereto.

The gate electrode GE is disposed on the gate insulating layer 112. The gate electrode GE is disposed on the gate insulating layer 112 so as to overlap with the channel region of the active layer ACT. The gate electrode GE may be made of any one of various metal materials, for example, molybdenum (Mo), aluminum (Al), chromium (Cr), gold (Au), titanium (Ti), nickel (Ni), neodymium (Nd), and copper (Cu) or an alloy of two or more of them, or may be a multilayer thereof, but is not limited thereto.

The gate electrode GE may be extended from the gate line GL. That is, the gate electrode GE may be integrally formed with the gate line GL, and the gate electrode GE and the gate line GL may be made of the same conductive material. For example, the gate line GL may be made of any one of molybdenum (Mo), aluminum (Al), chromium (Cr), gold (Au), titanium (Ti), nickel (Ni), neodymium (Nd), and copper (Cu) or an alloy of two or more of them, or may be a multilayer thereof, but is not limited thereto.

The gate line GL is a line configured to transfer a gate voltage to each of the plurality of sub-pixels SP and may be extended in the first direction crossing the pixel PX. For example, the gate line GL may be disposed between the first sub-pixel SP1 and the third sub-pixel SP3 and between the second sub-pixel SP2 and the fourth sub-pixel SP4. The gate line GL extended in the first direction may overlap with the high-potential power line VDD, the plurality of touch lines TL, the plurality of data lines DL, the reference line RL, and the low-potential power line VSS which are extended in the second direction.

An interlayer insulating layer 113 is disposed on the gate electrode GE. The interlayer insulating layer 113 may be formed as a single layer of silicon nitride (SiNx) or silicon oxide (SiOx) which is an inorganic material or a multilayer thereof, but is not limited thereto. In the interlayer insulating layer 113, contact holes for contact between the source electrode SE and the source region of the active layer ACT and between the drain electrode DE and the drain region of the active layer ACT are formed.

The source electrode SE and the drain electrode DE are disposed on the interlayer insulating layer 113. The source electrode SE and the drain electrode DE are disposed on the same layer and are spaced apart from each other. The source electrode SE and the drain electrode DE are electrically connected to the active layer ACT through the contact holes in the interlayer insulating layer 113.

The plurality of data lines DL is disposed on the interlayer insulating layer 113. That is, the plurality of data lines DL, the source electrode SE, and the drain electrode DE may be made of the same material by the same process on the interlayer insulating layer 113. For example, the plurality of data lines DL, the source electrode SE, and the drain electrode DE may be made of any one of molybdenum (Mo), aluminum (Al), chromium (Cr), gold (Au), titanium (Ti), nickel (Ni), neodymium (Nd), and copper (Cu) or an alloy of two or more of them, or may be a multilayer thereof, but are not limited thereto.

The plurality of data lines DL may be disposed in the emissive area EA. The plurality of data lines DL is a line extended in the second direction and configured to transfer a data voltage to each of the plurality of sub-pixels SP. The plurality of data lines DL includes a first data line DL1, a second data line DL2, a third data line DL3, and a fourth data line DL4. The first data line DL1 and the second data line DL2 may be disposed on one side of the reference line RL. In this case, the first data line DL1 may be disposed adjacent to the first touch line TL1 and the second touch line TL2, and the second data line DL2 may be disposed adjacent to the reference line RL. The third data line DL3 and the fourth data line DL4 may be disposed on the other side of the reference line RL. In this case, the fourth data line DL4 may be disposed adjacent to the third touch line TL3 and the fourth touch line TL4, and the third data line DL3 may be disposed adjacent to the reference line RL. The first data line DL1 may be electrically connected to the first sub-pixel SP1. The second data line DL2 may be electrically connected to the third sub-pixel SP3. The third data line DL3 may be electrically connected to the second sub-pixel SP2. The fourth data line DL4 may be electrically connected to the fourth sub-pixel SP4.

The compensation electrode CE is disposed on the interlayer insulating layer 113. The compensation electrode CE may be electrically connected to at least one of the plurality of touch lines TL disposed in the emissive area EA. Specifically, the compensation electrode CE may be electrically connected to the first touch line TL1 disposed in the emissive area EA. Herein, the first touch line TL1 may be spaced farther apart from the plurality of data lines DL than the second touch line TL2. The compensation electrode CE may be made of a transparent conductive material and extended from the emissive area EA to the transmissive area TA. In particular, an end portion of the compensation electrode CE disposed in the transmissive area TA may overlap with the cathode CT of the light emitting diode OLED. Accordingly, a capacitance Cp3 may be generated between the compensation electrode CE and the cathode CT. Therefore, the compensation electrode CE can compensate for a difference in capacitance between the first touch line TL1 and the second touch line TL2.

Meanwhile, as shown in FIG. 3, two compensation electrodes CE may be disposed in a single pixel PX. That is, the compensation electrodes CE may be respectively disposed on one side and the other side of the pixel PX. For example, the compensation electrode CE disposed on one side of the pixel PX may be disposed at a boundary between the transmissive area TA disposed on one side of the pixel PX and the emissive area EA. The compensation electrode CE disposed on the other side of the pixel PX may be disposed at a boundary between the transmissive area TA disposed on the other side of the pixel PX and the emissive area EA.

Specifically, the compensation electrode CE disposed on the other side of the pixel PX may be electrically connected to the fourth touch line TL4 disposed in the emissive area EA. Herein, the fourth touch line TL4 may be spaced farther apart from the plurality of data lines DL than the third touch line TL3. The compensation electrodes CE may be made of a transparent conductive material and extended from the emissive area EA to the transmissive area TA. In particular, an end portion of the compensation electrode CE disposed in the transmissive area TA may overlap with the cathode CT of the light emitting diode OLED. Accordingly, a capacitance may be generated between the compensation electrode CE and the cathode CT. Therefore, the compensation electrode CE can compensate for a difference in capacitance between the fourth touch line TL4 and the third touch line TL3.

Meanwhile, FIG. 3 illustrates that the compensation electrodes CE are disposed at the lower portion of the pixel PX, but the present disclosure is not limited thereto. That is, the positions of the compensation electrodes CE may vary depending on the design of the display device 100. Also, FIG. 3 illustrates that the compensation electrodes CE connected to the first touch line TL1 and the fourth touch line TL4, respectively, have the same size, but the present disclosure is not limited thereto. That is, if there may be a difference in capacitance generated at the first touch line TL1 and the fourth touch line TL4 due to a difference in position, the compensation electrodes CE may have different sizes from each other. For example, if a capacitance generated at the first touch line TL1 is smaller than a capacitance generated at the fourth touch line TL4, the compensation electrode CE connected to the first touch line TL1 may be greater in size than the compensation electrode CE connected to the fourth touch line TL4.

A first passivation layer 114 is disposed on the transistor TR, the plurality of data lines DL, and the compensation electrode CE. The first passivation layer 114 may be formed as a single layer of silicon nitride (SiNx) or silicon oxide (SiOx) which is an inorganic material or a multilayer thereof, but is not limited thereto. In the first passivation layer 114, a contact hole for contact between the drain electrode DE and the anode AN of the light emitting diode OLED may be formed.

The high-potential power line VDD and the low-potential power line VSS are disposed on the first passivation layer 114. The high-potential power line VDD and the low-potential power line VSS may be disposed in the emissive area EA. The high-potential power line VDD and the low-potential power line VSS may be made of the same material by the same process on the first passivation layer 114. For example, the high-potential power line VDD and the low-potential power line VSS may be made of a conductive material such as copper (Cu), aluminum (Al), molybdenum (Mo), nickel (Ni), titanium (Ti), chromium (Cr), or an alloy thereof, but are not limited thereto.

The high-potential power line VDD is a line configured to transfer a high-potential power voltage to each of the plurality of sub-pixels SP. A plurality of sub-pixels SP forming a single pixel PX may share a single high-potential power line VDD. For example, a single high-potential power line VDD may transfer a high-potential power voltage to each of the first sub-pixel SP1, the second sub-pixel SP2, the third sub-pixel SP3, and the fourth sub-pixel SP4. The high-potential power line VDD may be disposed to overlap with the first touch line TL1 and the second touch line TL2. Accordingly, the high-potential power line VDD may suppress the generation of a parasitic capacitance between the first touch lines TL1 and the anode AN and between the second touch lines TL2 and the anode AN.

The low-potential power line VSS is a line configured to transfer a low-potential power voltage to each of the plurality of sub-pixels SP. In this case, the cathode CT may be a common layer formed throughout the entire emissive area EA. Accordingly, a plurality of sub-pixels SP forming a single pixel PX may share a single low-potential power line VSS. For example, a single low-potential power line VSS may transfer a low-potential power voltage to each of the first sub-pixel SP1, the second sub-pixel SP2, the third sub-pixel SP3, and the fourth sub-pixel SP4 through the cathode CT which is a common layer. The low-potential power line VSS may be disposed to overlap with the third touch line TL3 and the fourth touch line TL4. Accordingly, the low-potential power line VSS may suppress the generation of a parasitic capacitance between the third touch lines TL3 and the anode AN and between the fourth touch lines TL4 and the anode AN.

A second passivation layer 115 is disposed on the high-potential power line VDD and the low-potential power line VSS. The second passivation layer 115 may be formed as a single layer of silicon nitride (SiNx) or silicon oxide (SiOx) which is an inorganic material or a multilayer thereof, but is not limited thereto. In the second passivation layer 115, a contact hole for contact between the drain electrode DE and the anode AN of the light emitting diode OLED may be formed.

A planarization layer 116 is disposed on the second passivation layer 115. The planarization layer 116 is an insulating layer configured to planarize an upper portion of the substrate 110. The planarization layer 116 may be made of an organic material, and may be formed as a single layer of, for example, polyimide or photo acryl or a multilayer thereof, but is not limited thereto.

The planarization layer 116 may include an opening OP corresponding to the transmissive area TA. The opening OP may expose a part of the second passivation layer 115. Herein, the opening OP may increase in width from top to bottom. That is, an upper portion of the planarization layer 116 may further protrude toward the opening OP than a lower portion of the planarization layer 116. Accordingly, an under-cut region may be formed at a lower portion of the opening OP by the protruding upper portion of the planarization layer 116. The emission layer EL to be described later and the cathode CT may be cut off by the under-cut region at a region corresponding to the opening OP. This will be described later.

The light emitting diode OLED is disposed on the planarization layer 116. The light emitting diode OLED may be disposed in the emissive area EA. The light emitting diode OLED may be disposed in each of the plurality of sub-pixels SP. The light emitting diode OLED includes the anode AN, the emission layer EL, and the cathode CT.

The anode AN is disposed on the planarization layer 116 so as to correspond to each of the plurality of sub-pixels SP. The anode AN is disposed only in the emissive area EA, but is not disposed in the transmissive area TA. The anode AN may be electrically connected to the drain electrode DE of the transistor TR. However, the anode AN may also be electrically connected to the source electrode SE of the transistor TR depending on the type of the transistor TR and the design method of the driver circuit. The anode AN may be made of a conductive material having a high work function to supply holes to the emission layer EL. For example, the anode AN may be formed to have a multilayered structure including a transparent conductive layer and an opaque conductive layer having high reflection efficiency. The transparent conductive layer may be made of a material having a relatively high work function value, such as indium tin oxide (ITO) or indium zinc oxide (IZO). The opaque conductive layer may be formed as a single layer or a multilayer containing Al, Ag, Cu, Pb, Mo, Ti, or an alloy thereof. However, the material of the anode AN is not limited thereto.

A bank 117 is disposed on the anode AN and the planarization layer 116. The bank 117 may be formed on the planarization layer 116 so as to cover an edge of the anode AN. The bank 117 is an insulating layer disposed between the plurality of sub-pixels SP to distinguish the plurality of sub-pixels SP. The bank 117 may be disposed at a boundary between sub-pixels SP adjacent to each other to suppress mixing of colors of light emitted from the light emitting diodes OLED of the plurality of sub-pixels SP, respectively. Also, the bank 117 may be disposed at a boundary between the emissive area EA and the transmissive area TA to distinguish the emissive area EA and the transmissive area TA. The bank 117 may be made of an organic insulating material. For example, the bank 117 may be made of one of an acrylic-based resin, an epoxy resin, a phenol resin, a polyamide-based resin, a polyimide-based resin, an unsaturated polyester resin, a polyphenylene-based resin, a polyphenylene sulfide-based resin, benzocyclobutene, and photoresist, but is not limited thereto.

The emission layer EL is disposed on the anode AN and the bank 117. The emission layer EL may be formed throughout the entire surface of the substrate 110. That is, the emission layer EL may be a common layer commonly formed in the plurality of sub-pixels SP. Also, a part of the emission layer EL may also be disposed in the transmissive area TA. The emission layer EL may be an organic layer for emitting light of a specific color. For example, the emission layer EL may be one of a red emission layer, a green emission layer, a blue emission layer, and a white emission layer. If the emission layer EL is a white emission layer, a color filter may be further disposed on the light emitting diode OLED. The emission layer EL may further include various layers such as a hole transport layer, a hole injection layer, a hole blocking layer, an electron injection layer, an electron blocking layer, an electron transport layer, and the like.

The cathode CT is disposed on the emission layer EL. The cathode CT may be formed throughout the entire surface of the substrate 110. That is, the cathode CT may be a common layer commonly formed in the plurality of sub-pixels SP. Also, a part of the cathode CT may also be disposed in the transmissive area TA. The cathode CT supplies electrons to the emission layer EL and thus may be made of a conductive material having a low work function. The cathode CT may be made of, for example, a transparent conductive material such as indium tin oxide (ITO) or indium zinc oxide (IZO), a metal alloy such as MgAg, or an ytterbium (Yb) alloy. The cathode CT may further include a metal doping layer, but is not limited thereto.

Since the emission layer EL and the cathode CT are formed throughout the entire surface of the substrate 110, a part of the emission layer EL and a part of the cathode CT may also be disposed in the transmissive area TA.

The dummy organic layer DM is disposed within the opening OP of the planarization layer 116. The dummy organic layer DM may be disposed on the second passivation layer 115. The dummy organic layer DM may be disposed in the transmissive area TA. The dummy organic layer DM may be made of the same material by the same process as the emission layer EL. Herein, the dummy organic layer DM and the emission layer EL are spaced apart from each other and thus may be electrically insulated from each other.

The touch electrode TE is disposed within the opening OP of the planarization layer 116. The touch electrode TE may be disposed to cover the dummy organic layer DM. The touch electrode TE may be disposed in the transmissive area TA. The touch electrode TE may be made of the same material by the same process as the cathode CT. Herein, the touch electrode TE and the cathode CT are spaced apart from each other and thus may be electrically insulated from each other.

The opening OP of the planarization layer 116 may include the under-cut region. That is, the upper portion of the planarization layer 116 may further protrude toward the opening OP than the lower portion of the planarization layer 116. Therefore, the opening OP may include the under-cut region hidden by the protruding upper portion of the planarization layer 116. When the emission layer EL and the cathode CT are deposited throughout the entire surface of the substrate 110, it is difficult to deposit the emission layer EL and the cathode CT on the under-cut region. Accordingly, the emission layer EL and the cathode CT disposed on the planarization layer 116 may be discontinuously disposed on one side and the other of the opening OP. Also, when the emission layer EL is deposited, the dummy organic layer DM made of the same material as the emission layer EL may be disposed within the opening OP. The emission layer EL and the dummy organic layer DM may be cut off from each other. When the cathode CT is deposited, the touch electrode TE made of the same material as the cathode CT may be disposed within the opening OP. The cathode CT and the touch electrode TE may be cut off from each other.

There may be a difference in total capacitance between a plurality of touch lines depending on the position of each of the plurality of touch lines, which may cause a decrease in accuracy in touch sensing. In particular, a difference in capacitance between the plurality of touch lines may be most affected by a distance between the plurality of touch lines and a data line, a distance between the plurality of touch lines and the high-potential power line, or a distance between the plurality of touch lines and a low-potential power line.

In the display device 100 according to an example embodiment of the present disclosure, the compensation electrode CE may be disposed to reduce or minimize a difference in capacitance between the plurality of touch lines TL. Accordingly, the total capacitance of each of the plurality of touch lines TL can be uniform, which may cause an improvement in accuracy in touch sensing.

Specifically, the second touch line TL2 is disposed closer to the first data line DL1 than the first touch line TL1. Accordingly, a capacitance Cp2 between the second touch line TL2 and the first data line DL1 is greater than a capacitance Cp1 between the first touch line TL1 and the first data line DL1. To compensate for this difference, the first touch line TL1 may be electrically connected to the compensation electrode CE. That is, the total capacitance of the first touch line TL1 can be increased by the compensation electrode CE. One end of the compensation electrode CE may be electrically connected to the first touch line TL1 and the other end of the compensation electrode CE may overlap with the cathode CT of the light emitting diode OLED. Therefore, the capacitance Cp3 may be generated between the compensation electrode CE and the cathode CT. In this case, the sum of the capacitance Cp1 between the first touch line TL1 and the first data line DL1 and the capacitance Cp3 between the compensation electrode CE and the cathode CT may be equal to the capacitance Cp2 between the second touch line TL2 and the first data line DL1. Therefore, a difference in capacitance between the first touch line TL1 and the second touch line TL2 can be reduced or minimized.

Further, as shown in FIG. 3, each pixel PX may include two compensation electrodes CE. That is, one of the plurality of compensation electrodes CE may be electrically connected to the first touch line TL1, and the other compensation electrode CE may be electrically connected to the fourth touch line TL4. The fourth touch line TL4 may be disposed farther from the fourth data line DL4 than the third touch line TL3. Accordingly, a capacitance between the fourth touch line TL4 and the fourth data line DL4 is smaller than a capacitance between the third touch line TL3 and the fourth data line DL4. Therefore, the total capacitance of the fourth touch line TL4 can be increased by the compensation electrode CE electrically connected to the fourth touch line TL4. That is, a difference in capacitance between the third touch line TL3 and the fourth touch line TL4 can be reduced or minimized by a capacitance generated between the compensation electrode CE and the cathode CT.

In the display device 100 according to an example embodiment of the present disclosure, the compensation electrode CE may be disposed in each of the plurality of pixels PX. That is, the compensation electrode CE connected to a single touch line TL is not disposed at a single specific point, but a plurality of compensation electrodes CE may be provided in the plurality of pixels PX, so that the plurality of compensation electrodes CE may be connected to the single touch line TL. If a compensation electrode for compensating for a difference in capacitance is disposed at a single specific point of the touch line TL, the amount of output sensed at an area corresponding to the compensation electrode may remarkably increase. In this case, the amount of output sensed may exceed a normal output range. As a result, a change in touch may not be recognized. Accordingly, in the display device 100 according to an example embodiment of the present disclosure, a compensation capacitance generated by the compensation electrodes CE may be uniformly distributed throughout the plurality of pixels PX. Therefore, it is possible to suppress a remarkable increase in amount of output of the touch line TL at a specific point. That is, the amount of output from the touch line TL may be uniform throughout the entire touch line. Therefore, the accuracy in sensing of the touch line TL can be improved, and the quality of the display device 100 can be improved.

In the display device 100 according to an example embodiment of the present disclosure, the compensation electrode CE may be made of a transparent conductive material. Accordingly, the compensation electrode CE may be extended to the transmissive area TA from the emissive area EA in which the touch line TL is disposed. Herein, an opaque electrode or line for driving the plurality of subpixels SP is not disposed in the transmissive area TA. Therefore, the compensation electrode CE may be formed within the transmissive area TA so as to have a sufficient area for compensating for a capacitance of the touch line TL. Also, the compensation electrode CE may not affect the design of the components in the emissive area EA. Therefore, the compensation electrode CE can be easily formed within the pixel PX.

The display device 100 according to an example embodiment of the present disclosure may be a display device having an in-cell touch structure. That is, a structure for implementation of touch sensing is not separately formed, but may be formed together with other components within the display device 100 by a continuous process. Specifically, the plurality of touch lines TL may be formed by the same process as the light shielding layer LS. Also, the plurality of touch electrodes TE may be formed by the same process as the cathode CT. Accordingly, a touch structure can be implemented within the display device 100 by a simple process with minimum cost.

Figure 5:
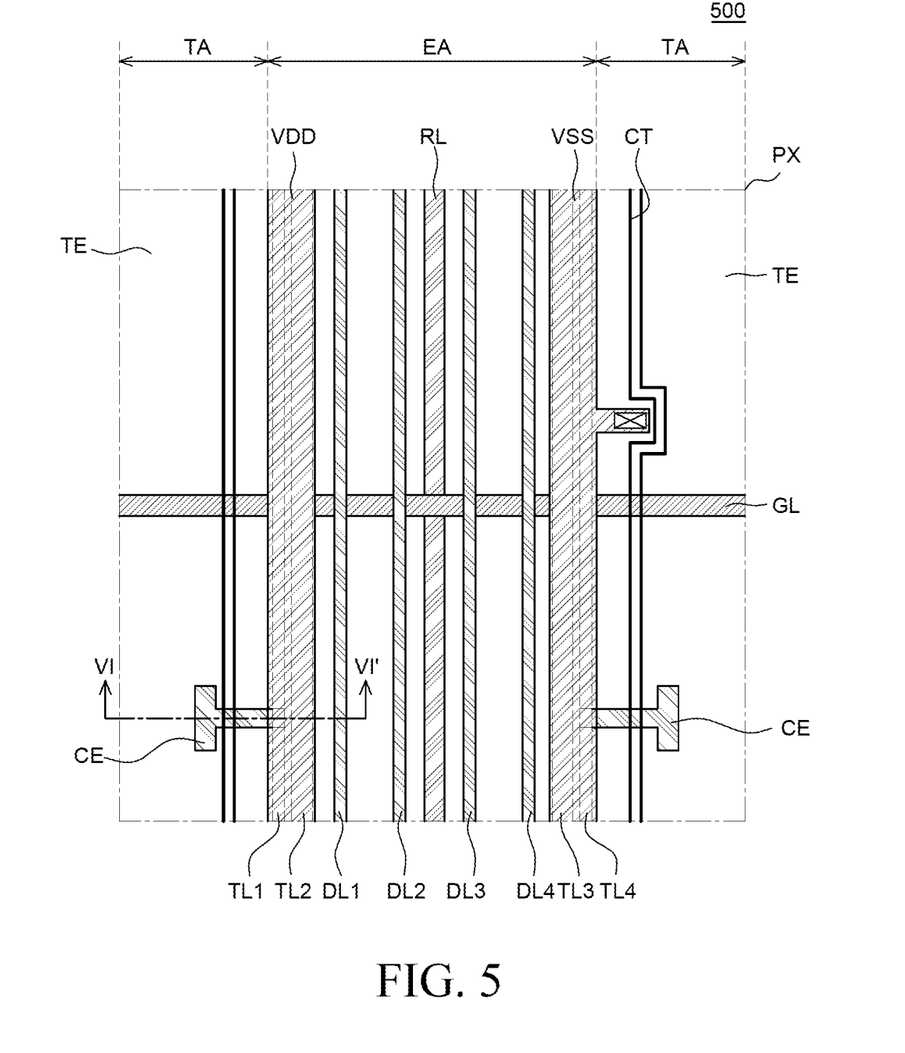
FIG. 5 is a plan view illustrating a display device according to another example embodiment of the present disclosure.
Figure 6:
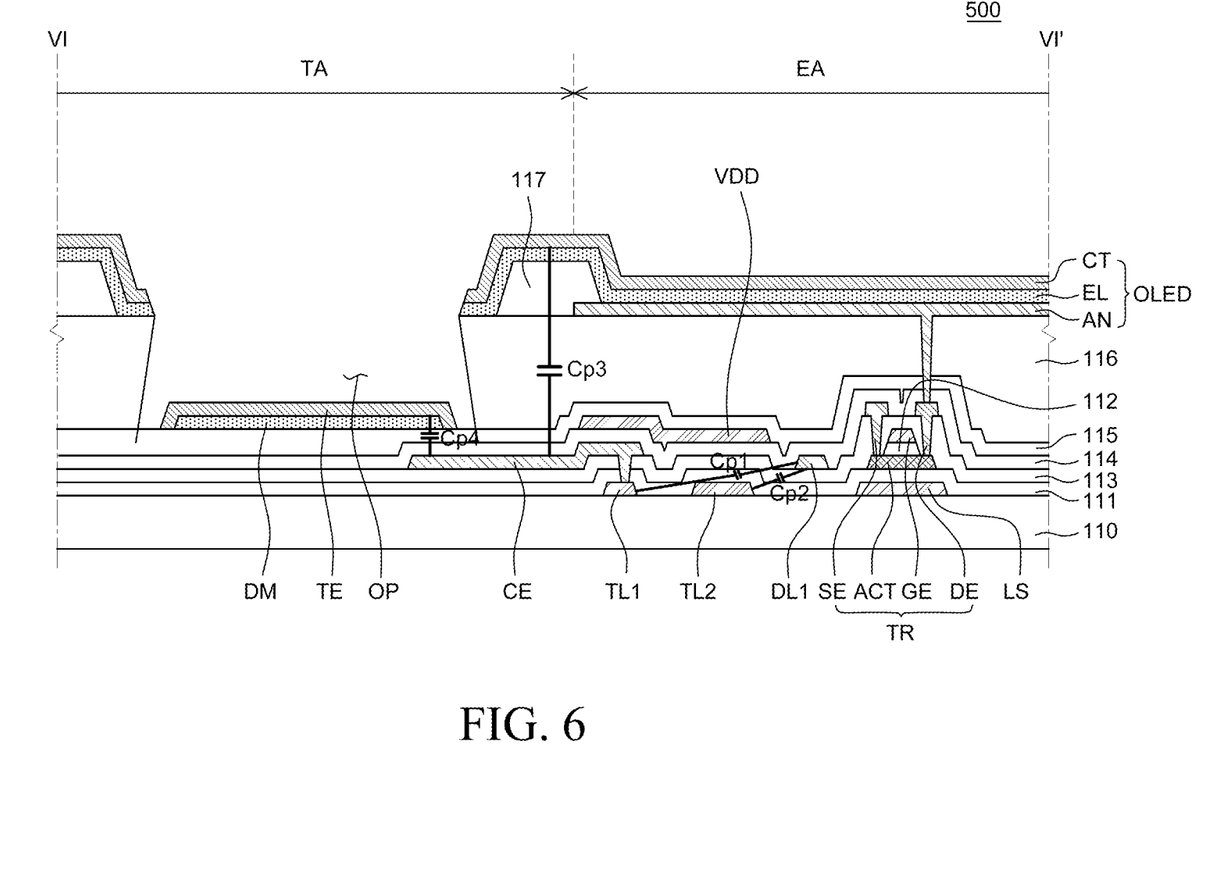
FIG. 6 is a cross-sectional view as taken along a line VI-VI' of FIG. 5.

FIG. 5 is a plan view illustrating a display device according to another example embodiment of the present disclosure. FIG. 6 is a cross-sectional view as taken along a line VI-VI' of FIG. 5. A display device 500 shown in FIG. 5 and FIG. 6 is substantially the same as the display device 100 shown in FIG. 1 through FIG. 4 except for the plurality of touch lines TL and the compensation electrode CE. Therefore, a redundant description thereof will be omitted.

Referring to FIG. 5 and FIG. 6, the display device 500 includes the plurality of touch lines TL, and at least one of the plurality of touch lines TL may be electrically connected to the compensation electrode CE.

The plurality of touch lines TL may include the first touch line TL1, the second touch line TL2, the third touch line TL3, and the fourth touch line TL4. In this case, the first touch line TL1 and the second touch line TL2 may be disposed adjacent to the transmissive area TA disposed on one side of the emissive area EA. The third touch line TL3 and the fourth touch line TL4 may be disposed adjacent to the transmissive area TA disposed on the other side of the emissive area EA.

The second touch line TL2 may be disposed closer to the first data line DL1 than the first touch line TL1. The second touch line TL2 may have a greater width than that of the first touch line TL1. The third touch line TL3 may be disposed closer to the fourth data line DL4 than the fourth touch line TL4. The third touch line TL3 may have a greater width than that of the fourth touch line TL4.

The compensation electrode CE may be electrically connected to the first touch line TL1 disposed in the emissive area EA. The compensation electrode CE may be made of a transparent conductive material and extended from the emissive area EA to the transmissive area TA. A part of the compensation electrode CE disposed in the transmissive area TA may overlap with the cathode CT. Also, an end portion of the compensation electrode CE disposed in the transmissive area TA may overlap with the touch electrode TE. Accordingly, the capacitance Cp3 may be generated between the compensation electrode CE and the cathode CT. Further, a capacitance Cp4 may be generated between the compensation electrode CE and the touch electrode TE. Therefore, the compensation electrode CE can compensate for a difference in capacitance between the first touch line TL1 and the second touch line TL2.

Also, the compensation electrode CE may be electrically connected to the fourth touch line TL4 disposed in the emissive area EA. The compensation electrode CE may be made of a transparent conductive material and extended from the emissive area EA to the transmissive area TA. A part of the compensation electrode CE disposed in the transmissive area TA may overlap with the cathode CT. Also, an end portion of the compensation electrode CE disposed in the transmissive area TA may overlap with the touch electrode TE. Accordingly, a capacitance may be generated between the compensation electrode CE and the cathode CT. Further, a capacitance may be generated between the compensation electrode CE and the touch electrode TE. Therefore, the compensation electrode CE can compensate for a difference in capacitance between the fourth touch line TL4 and the third touch line TL3.

In the display device 500 according to another example embodiment of the present disclosure, the compensation electrode CE may be disposed to reduce or minimize a difference in capacitance between the plurality of touch lines TL. In this case, one end of the compensation electrode CE may be disposed in the emissive area EA and the other end of the compensation electrode CE may be disposed in the transmissive area TA. In particular, the other end of the compensation electrode CE may overlap with the touch electrode TE in the transmissive area TA. Therefore, a difference in capacitance between the plurality of touch lines TL can be reduced or minimized by a capacitance generated between the compensation electrode CE and the touch electrode TE.

Meanwhile, a part of the cathode CT is also disposed in the transmissive area TA, and, thus, the compensation electrode CE may overlap with the cathode CT in the transmissive area TA. That is, a capacitance generated by the compensation electrode CE may include the capacitance Cp3 between the compensation electrode CE and the cathode CT and the capacitance Cp4 between the compensation electrode CE and the touch electrode TE. In this case, the touch lines TL1 and TL4 connected to the compensation electrode CE may have a smaller width than that of the touch lines TL2 and TL3 not connected to the compensation electrode CE. Therefore, the sum of capacitances generated at the first touch line TL1 may be similar to the sum of capacitances generated at the second touch line TL2. Further, the sum of capacitances generated at the fourth touch line TL4 may be similar to the sum of capacitances generated at the third touch line TL3. Accordingly, a difference in capacitance between the plurality of touch lines TL can be reduced or minimized, which may cause an improvement in accuracy in touch sensing.

The example embodiments of the present disclosure can also be described as follows:

According to an aspect of the present disclosure, the display device includes: a substrate in which a plurality of pixels each including an emissive area and a transmissive area is disposed. Also, the display device includes a plurality of touch lines in the emissive area and a plurality of data lines in the emissive area. Further, the display device includes a compensation electrode electrically connected to at least one of the plurality of touch lines. Furthermore, the display device includes a planarization layer on the plurality of touch lines and the plurality of data lines and including an opening corresponding to the transmissive area. Moreover, the display device includes a light emitting diode on the planarization layer in the emissive area and a touch electrode disposed within the opening in the transmissive area. The plurality of touch lines includes a first touch line and a second touch line closer to the plurality of data lines than the first touch line. The compensation electrode is electrically connected to the first touch line.

The plurality of touch lines and the plurality of data lines may be disposed on different insulating layers.

The compensation electrode may be extended from the emissive area to the transmissive area.

One end of the compensation electrode may be electrically connected to the first touch line in the emissive area, and the other end of the compensation electrode may overlap with a cathode of the light emitting diode in the transmissive area.

One end of the compensation electrode may be electrically connected to the first touch line in the emissive area, and the other end of the compensation electrode may overlap with the touch electrode in the transmissive area.

The second touch line may have a greater width than that of the first touch line.

An anode of the light emitting diode may be disposed only in the emissive area among the emissive area and the transmissive area.

The compensation electrode may be made of a transparent conductive material.

The display device may further include a dummy organic layer disposed within the opening in the transmissive area and made of the same material as an emission layer of the light emitting diode. The touch electrode may be disposed on the dummy organic layer.

The dummy organic layer and the emission layer may be spaced apart from each other.

The touch electrode and a cathode of the light emitting diode may be made of the same material.

The touch electrode and the cathode may be spaced apart from each other.

The touch electrode and the cathode may be made of a transparent conductive material.

The opening may be increased in width from top to bottom, so that an under-cut region is formed at a lower portion of the opening.

A plurality of the compensation electrodes may be provided in the plurality of pixels, so that the plurality of the compensation electrodes are electrically connected to the first touch line.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device, comprising:
   a substrate in which a plurality of pixels each including an emissive area and a transmissive area is disposed;
   a plurality of touch lines in the emissive area;
   a plurality of data lines in the emissive area;
   a compensation electrode electrically connected to at least one of the plurality of touch lines;
   a planarization layer on the plurality of touch lines and the plurality of data lines, the planarization layer including an opening corresponding to the transmissive area;
   a light emitting diode on the planarization layer in the emissive area; and
   a touch electrode disposed within the opening in the transmissive area,
   wherein the plurality of touch lines includes a first touch line and a second touch line closer to the plurality of data lines than the first touch line, and
   wherein the compensation electrode is electrically connected to the first touch line.

2. The display device according to claim 1, wherein the plurality of touch lines and the plurality of data lines are disposed on different insulating layers.

3. The display device according to claim 1, wherein the compensation electrode is extended from the emissive area to the transmissive area.

4. The display device according to claim 1, wherein one end of the compensation electrode is electrically connected to the first touch line in the emissive area, and
   wherein the other end of the compensation electrode overlaps with a cathode of the light emitting diode in the transmissive area.

5. The display device according to claim 1, wherein one end of the compensation electrode is electrically connected to the first touch line in the emissive area, and
   wherein the other end of the compensation electrode overlaps with the touch electrode in the transmissive area.

6. The display device according to claim 5, wherein the second touch line has a greater width than that of the first touch line.

7. The display device according to claim 1, wherein an anode of the light emitting diode is disposed only in the emissive area among the emissive area and the transmissive area.

8. The display device according to claim 1, wherein the compensation electrode is made of a transparent conductive material.

9. The display device according to claim 1, further comprising:
a dummy organic layer disposed within the opening in the transmissive area and made of a same material as an emission layer of the light emitting diode,
wherein the touch electrode is disposed on the dummy organic layer.

10. The display device according to claim 9, wherein the dummy organic layer and the emission layer are spaced apart from each other.

11. The display device according to claim 1, wherein the touch electrode and a cathode of the light emitting diode are made of a same material.

12. The display device according to claim 11, wherein the touch electrode and the cathode are spaced apart from each other.

13. The display device according to claim 11, wherein the touch electrode and the cathode are made of a transparent conductive material.

14. The display device according to claim 1, wherein the opening is increased in width from top to bottom.

15. The display device according to claim 1, wherein a plurality of the compensation electrodes are provided in the plurality of pixels, and
wherein the plurality of the compensation electrodes are electrically connected to the first touch line.

16. The display device according to claim 14, comprising an under-cut region formed at a lower portion of the opening.

* * * * *